US 6,595,736 B2

(12) United States Patent
Lybarger

(10) Patent No.: US 6,595,736 B2
(45) Date of Patent: Jul. 22, 2003

(54) UNLOADER RETAINING ARM ASSEMBLY

(75) Inventor: Brian Lybarger, Granite City, IL (US)

(73) Assignee: Systems & Electronics, Inc., St. Louis, MO (US)

(*) Notice: Subject to any disclaimer, the term of this patent is extended or adjusted under 35 U.S.C. 154(b) by 42 days.

(21) Appl. No.: 09/952,676

(22) Filed: Sep. 11, 2001

(65) Prior Publication Data
US 2003/0049106 A1 Mar. 13, 2003

(51) Int. Cl.[7] ............................................. B65G 65/23
(52) U.S. Cl. ....................... 414/421; 414/425; 294/902
(58) Field of Search ................................ 414/447, 763, 414/766, 782, 362, 403, 419, 420, 421

(56) References Cited

U.S. PATENT DOCUMENTS

| 2,321,300 | A | * | 6/1943 | Keagy | 414/421 |
|---|---|---|---|---|---|
| 3,978,999 | A | * | 9/1976 | Ryder | 414/421 |
| 5,263,425 | A | * | 11/1993 | Koenig | 110/173 C |
| 5,302,073 | A | * | 4/1994 | Riemersma et al. | 414/421 |
| 5,558,485 | A | * | 9/1996 | Haynes | 414/421 |
| 5,582,500 | A | * | 12/1996 | Morris | 414/422 |
| 6,234,550 | B1 | * | 5/2001 | Stoltenhoff et al. | 294/119.1 |
| 6,394,736 | B1 | * | 5/2002 | Derby et al. | 414/583 |

* cited by examiner

Primary Examiner—Dean J. Kramer
Assistant Examiner—Charles A. Fox
(74) Attorney, Agent, or Firm—Polster, Lieder, Woodruff & Lucchesi, L.C.

(57) ABSTRACT

A retainer arm assembly (30) for use in a container unloading assembly (10) for unloading containers (C) of various sizes. Pivot posts (34) are attached to opposite sides (20) of a fixture (18) into which containers to be unloaded are set. The fixture is movable to invert the container and dump its contents. Retaining arms (32) are mounted on each pivot post and moved by the pivot posts to a position above an open end of the container. The retaining arms now retain container in the fixture as the contents of the container are dumped. A mechanism (54) is activated to rotate each post from a first position to a second position, after the container is placed in the fixture, for the retaining arms to be located above the container. Other of the retaining arms mounted on each pivot post may contact the container as the pivot posts are rotated.

15 Claims, 2 Drawing Sheets

UNLOADER RETAINING ARM ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to unloading systems for automatically emptying containers of their contents, and more particularly, to a retaining arm assembly for use in such systems.

In automated unloading systems, a container is first constrained within a holding fixture. The fixture is pivotable about an axis so to rotate the container from an initial, upright position to a substantially inverted position. At this inverted position, the contents of the container spill out of the container into another receptacle, for example, or onto a conveyor. The fixture is then rotated back to its original position in which the container is returned to its upright position. The container is then released from the fixture so a new container can be set in place. During this unloading operation, it is desirable that the container not slide out of, or fall through, the fixture.

One problem of current unloading systems is their inability to accommodate a variety of different size and shaped containers. In the U.S. Postal System, for examples, containers can be very tall wire or metal frame containers, relatively short containers made of a molded plastic, or cloth hampers. It is extremely advantageous that an unloading system be able to unload each type of container, automatically, and without having to modify the system each time a different size container is to be unloaded.

For purposes of flexibility, the unloading system should be able to accommodate containers of various sizes and be able to hold the container, regardless of is size, firmly in place throughout the unloading or dumping cycle. Otherwise, if the container slides or falls out of the fixture, the contents of the container may not be completely emptied, and secondary operations will be required, adding to the time of the unloading operation and its cost. In this latter regard, it is important that the container be held in place so that it cannot inadvertently fall off the fixture and cause injury to people. A restraint, such as described herein, holds containers of various sizes in the fixture so these types of problems do not occur.

BRIEF SUMMARY OF THE INVENTION

Among the several objects of the present invention may be noted the provision of a retaining arm assembly for use in a container unloading system. The assembly utilizes a plurality of mechanical arms arranged on opposite sides of an unloading fixture into which containers of various sizes can be loaded for emptying of their contents. The arms on each side of the container are commonly mounted on a pivot post. When a container is placed in the fixture, the arms are pivoted into a position where they contact the container. Throughout the dumping cycle, an arm on each post, above the top of the container, is in a position which blocks movement of the container in the direction by which it might otherwise slide out of, or fall off the fixture. After unloading is completed and the fixture is returned to its initial position, the arms are pivoted away from the container and it is removed from the fixture. It is an advantage of the invention that the arms are spaced along the length of the pivot post so that as containers of different sizes are set in the fixture, one or more arms on each side of the fixture is moved into a container blocking position. The assembly insures that the containers are held in place throughout the unloading operation so that the contents of containers are properly dumped, no spillage occurs, and the container cannot fall out of the fixture. The retaining arm assembly provides a relatively low cost, easy to install and repair solution to unloading operations in which a variety of different size containers must be accommodated without having to alter the unloader installation as different size containers are brought in for unloading. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
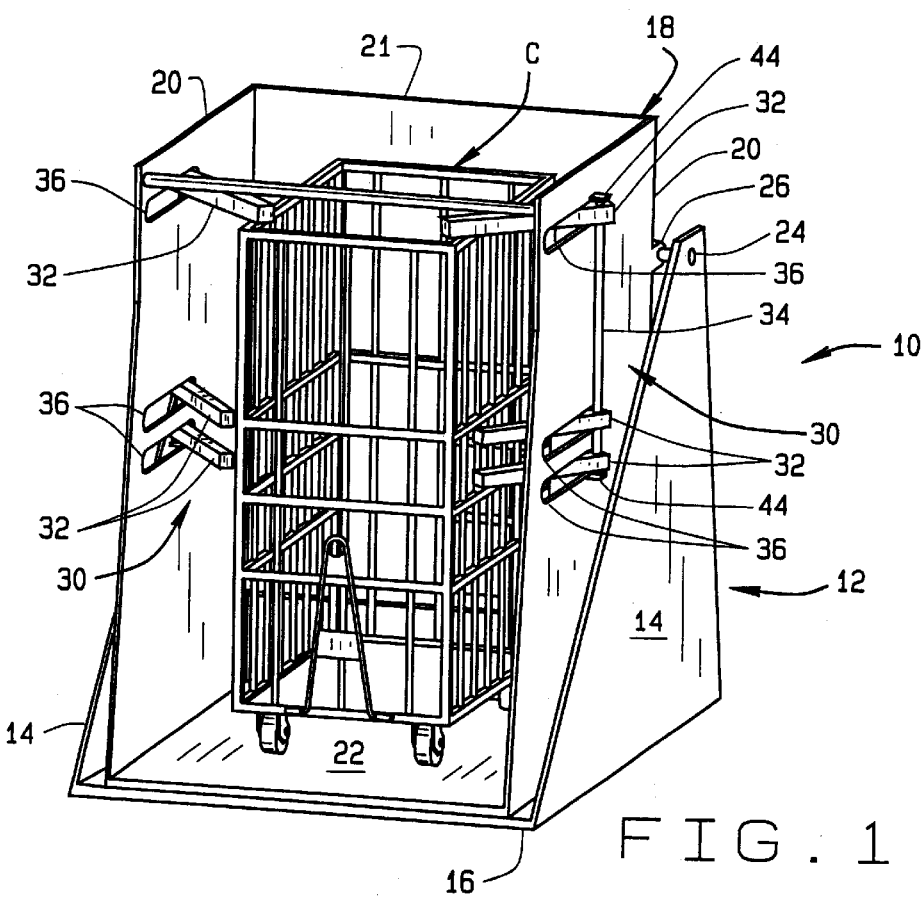
FIG. 1 is perspective view of a container unloading system employing a retaining arm assembly of the present invention; and, FIG. 2 is a perspective view of a retaining arm used in the assembly.

Referring to the drawings, an unloading assembly for dumping the contents of a container is indicated generally 10 in FIG. 1. The assembly includes a first, generally U-shaped outer fixture 12 having upstanding sidewalls 14 and a base 16. A second fixture 18 is sized to fit within fixture 12 and to pivot about the fixture. Fixture 18 is a generally rectangular shaped structure having sidewalls 20, a backwall 21, and a base 22. However, the front and top of this second fixture are open so a container C can be loaded into the fixture. In FIG. 1, container C is shown to be a metal frame container mounted on rollers. However, the containers loaded into assembly 10 can be taller or shorter, made of plastic or cloth, and be mounted on skids or carried by hand. A rod 24 is pivotally mounted to the sidewalls 14 of fixture 12. The rod extends through brackets 26 projecting from the rear of the sidewalls 20 of fixture 18. Rod 24 allows fixture 18 to be rotated from its position shown in FIG. 1 to a position in which container C is substantially inverted and the contents of the container spill out so to empty the container. Once the container is empty, the process is reversed and the container is returned to its position shown in FIG. 1.

To retain a container C in place throughout this unloading operation, a retaining assembly 30 of the present invention is provided. Assembly 30 includes a plurality of retaining arms 32 commonly mounted on a pivot post 34. Two assemblies 30 are provided as shown in FIG. 1. One of the assemblies is mounted on each of the sidewalls 20 of fixture 18. Each assembly is mounted to the outside of the fixture sidewall so to extend vertically of fixture 18, and openings or slots 36 are formed in the sidewalls, at the location of the retaining arms 32, for the arms to extend through the sidewalls. It will be understood by those skilled in the art that the number of retaining arms can be more or less than the three arms shown in FIG. 1. Further, the spacing of the arms on the posts can be different than is shown in the drawing. However, it is a feature of the invention that corresponding arms mounted on opposite posts are generally on the same plane. Regardless of the number of retaining arms and their locations, an important advantage of the invention is that whatever size container is placed in fixture 18, when the pivot posts are rotated, at least one set of retaining arms are positioned above the top, open end of the container. Now, when the container is being emptied, the retaining arms block movement of the container, were it to slide or fall through the fixture, so the container is retained in the fixture at all times.

Figure 2:
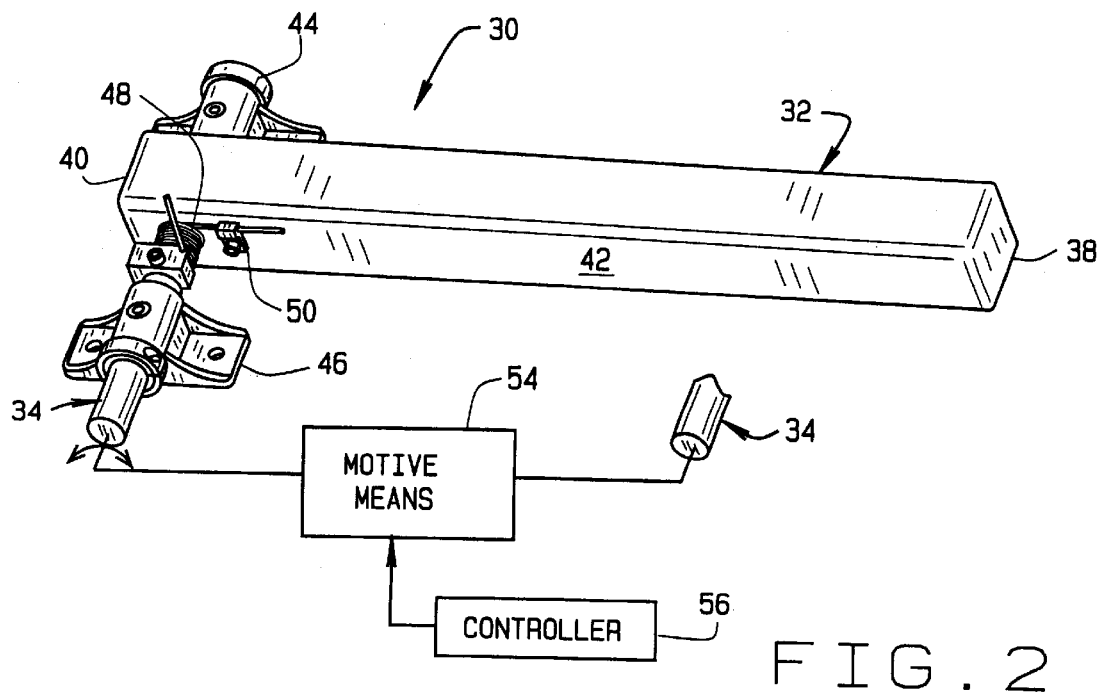

As shown in FIG. 2, the retaining arms 32 are rectangularly shaped arms the distal end 38 of which contacts the container loaded into fixture 18. A proximal end 40 of the retaining arm has openings in the sidewalls 42 of the arm for mounting the retaining arm on post 34. The ends of post 34 are journaled for rotation into mounting brackets 44 which, in turn, are attached to the outer surface of the sidewalls 20 of fixture 18. Additional brackets 46 may be mounted to a sidewall 20, intermediate the ends of assembly 30, so to support post 34 at various locations along the length of the assembly. Each bracket 46 supports rotation of the post. Each retaining arm is spring loaded onto pivot post 34. As shown in FIG. 2, a torsion spring 48 is seated on the pivot post. One end of the spring is attached to sidewall 42 of the retaining arm using a bracket 50. The other end of the spring bears against a bracket 52 which is fixedly mounted onto the pivot post so to rotate with the pivot post.

Rotation of the pivot posts is by a motive means indicated generally 54 in FIG. 2. The motive means can be hydraulic, pneumatic, or electrical. The motive means includes two separate units, one for each assembly 30. Activation of the motive means is controlled by a controller 56 of unloading assembly 10 so the retaining arm assemblies are operated in unison with the overall operation of assembly 10. The pivot posts are simultaneously moved by the motive means to move their associated retaining arms into and out of contact with a container and to position those retaining arms not contacting the container above the open end of the container.

Figure 3:
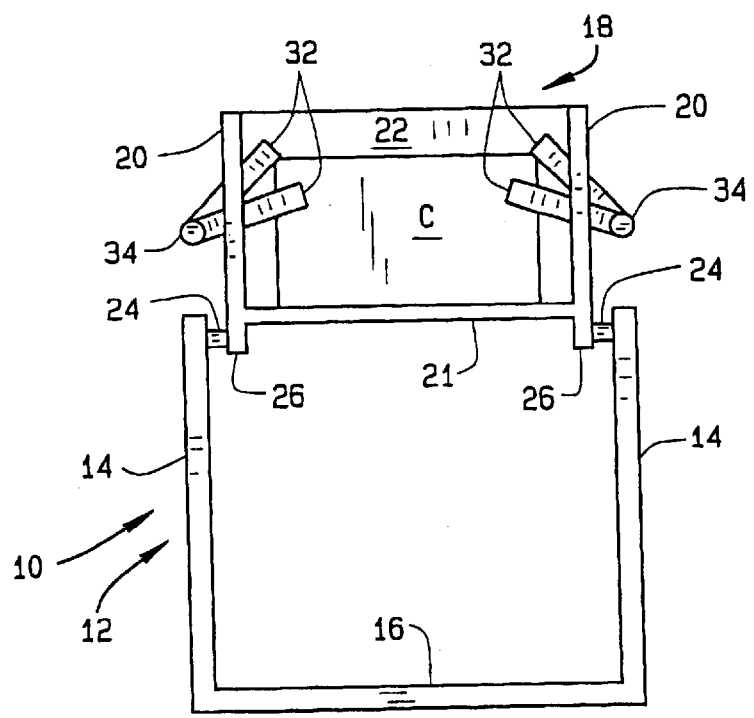
FIG. 3 illustrates operation of the invention to block a container from falling out of an unloading fixture during an unloading sequence; and, FIG. 4 illustrates a second embodiment of the invention in which two retaining arm assemblies are installed on each side of the fixture.

Operation of assembly 10 is such that when fixture 18 is empty, motive means 54 operates to move the pivot posts so the retaining arms are rotated outwardly as shown in FIG. 1. After a container C is positioned within fixture 18, the motive means is again operated to simultaneously rotate the retaining arms inwardly toward the container. The amount of rotation of the retaining arms is, for example, 45°. As this occurs, the outer ends of the retaining arms may contact the container and bear against it. However, as shown in FIG. 3, those retaining arms which do not contact the container are moved into a blocking position above the container. Now, when the container is inverted to dump its contents, these uppermost retaining arms are in a position to block movement of the container if it were to now begin to slide through the fixture and fall out of it. Once the empty container is returned to its upright position, the motive means is again operated to rotate the pivot posts 34 and move the retaining arms out of contact with the container. Once the retaining arms are moved out of the way, the container is removed and a new one set in place.

What has been described is a retaining arm assembly used in a container unloading operation to insure that the container being unloaded remains in place during the operation. Importantly, the retainer assembly allows a variety of containers to be unloaded by the assembly 10 without having to modify the setup or operation of the unloading assembly.

Figure 4:
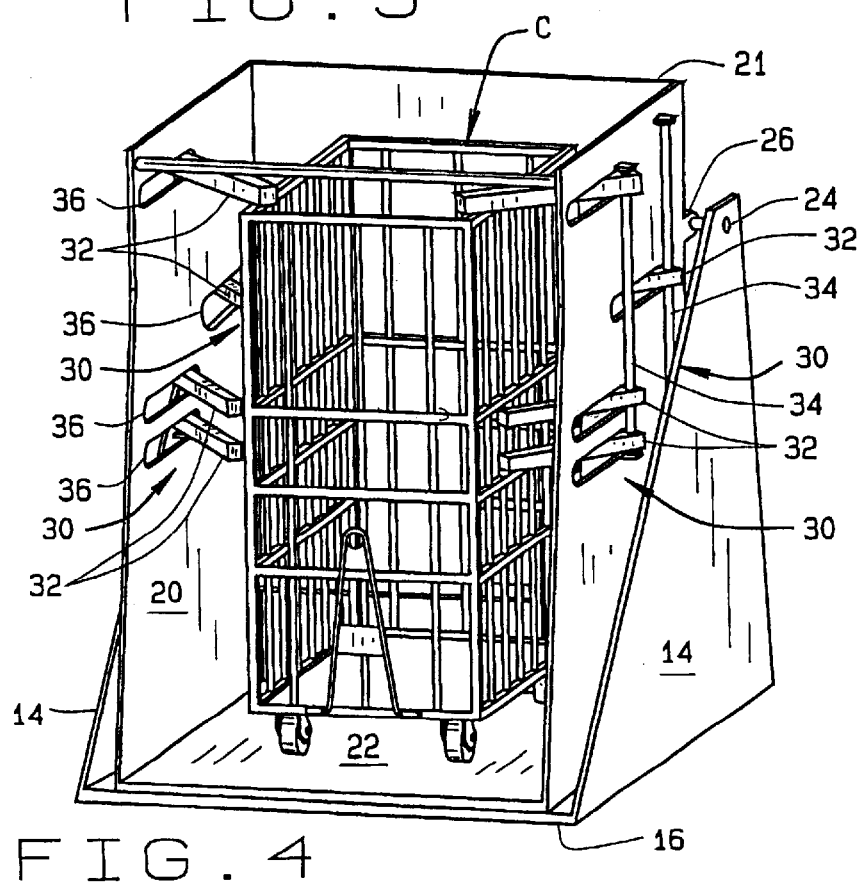

Finally, referring to FIG. 4, in some installations, it is desirable to employ a second retaining arm assembly 30 on each side of fixture 18. This embodiment has the advantage of allowing for an even greater variety of containers to be unloaded by assembly 10. As shown in FIG. 4, the second retaining arm assembly employs only one arm mounted on each post. The pivot posts 34 of these second assemblies is also controlled by motive means 54 and operation of these second assemblies 30 is as previously described.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A retainer arm assembly for use in a container unloading assembly for unloading containers of various sizes comprising:

a first pivot post attached to one side of a fixture into which containers to be unloaded are set, the fixture being rotatable from a container upright position to a substantially inverted position at which the contents of the container are dumped;

a plurality of retaining arms mounted on the first pivot post for contacting the container and holding it in place in the fixture;

a second divot post attached to an opposite side of the fixture;

a plurality of retaining arms mounted on said second pivot post for also contacting the container and holding it in place;

the retaining arms mounted on each post being in a spaced relationship with each other with the spacing of the arms allowing the assembly to be used with containers of different sizes; and, motive means for rotating the first and second posts from a first position to a second position after the container is placed in the fixture, the retaining arms being positioned above an open end of the container as the pivot post rotates to its second position to retain the container in the fixture as it is inverted.

2. The assembly of claim 1 wherein one or more of the retaining arms may contact a side of the container as the pivot post is rotated and the assembly further includes spring means connected to each retaining arm to maintain the retaining arm in contact with the container when the post is at its second position.

3. The assembly of claim 2, wherein the spring means includes a torsion spring mounted on a pivot post adjacent a retaining arm.

4. The assembly of claim 1 wherein the fixture has opposed sidewalls between which the container is set, each pivot post being mounted on an outside surface of the respective sidewalls, and the sidewalls having openings formed therein through which the retaining arms extend.

5. The assembly of claim 1 further including an additional pivot post located on each side of the fixture and at least one retaining arm mounted on each additional pivot post.

6. The assembly of claim 5 wherein the number of retaining arms mounted on each additional post differs from the number of retaining arms mounted on the first said pivot posts.

7. A retainer arm assembly for use in a container unloading assembly for unloading containers of various sizes comprising:
- a first pivot post and a second pivot post, the pivot posts being attached to opposite sides of a fixture into which containers to be unloaded are set, the fixture being movable from a container upright position to a substantially inverted position at which the contents of the container are dumped;
- a plurality of retaining arms mounted on each pivot post for contacting the container and holding it in place in the fixture; and,
- motive means for rotating each post from a first position to a second position after the container is placed in the fixture with at least one of the retaining arms being positioned above an open end of the container as the pivot post rotates to its second position to retain the container in the fixture as it is inverted.

8. The assembly of claim 7 wherein the retaining arms are mounted on each post in a spaced relationship thereby allowing the assembly to be used with containers of different sizes.

9. The assembly of claim 8 wherein one or more of the retaining arms may contact a side of the container as the pivot post is rotated and the assembly further includes spring means connected to each retaining arm to maintain the arm in contact with the container when the post is at its second position.

10. The assembly of claim 9 wherein the spring means includes a torsion spring mounted on a pivot post adjacent a retaining arm.

11. The assembly of claim 10 wherein each spring means includes a first bracket fixedly mounted on the pivot post to which one end of the torsion spring is connected, and a bracket attached to the retaining arm and to which the other end of the torsion spring is connected.

12. The assembly of claim 11 the fixture has opposed sidewalls between which the container is set, each pivot post being mounted on an outside surface of the respective sidewalls, and the sidewalls having openings formed therein through which the retaining arms extend.

13. The assembly of claim 7 wherein each retaining arm is rectangular in cross-section.

14. The assembly of claim 7 further including an additional pivot post located on each side of the fixture and at least one retaining arm mounted on each additional pivot post.

15. The assembly of claim 14 wherein the number of retaining arms mounted on each additional post differs from the number of retaining arms mounted on the first said pivot posts.

* * * * *

UNITED STATES PATENT AND TRADEMARK OFFICE
CERTIFICATE OF CORRECTION

PATENT NO.     : 6,595,736 B2
DATED          : July 22, 2003
INVENTOR(S)    : Brian Lybarger It is certified that error appears in the above-identified patent and that said Letters Patent is hereby corrected as shown below:

Column 4,
Line 33, change "divot" to -- pivot --.

Signed and Sealed this

Sixteenth Day of September, 2003

JAMES E. ROGAN
*Director of the United States Patent and Trademark Office*